United States Patent [19]

Colyer et al.

[11] Patent Number: 5,223,322
[45] Date of Patent: Jun. 29, 1993

[54] DECORATIVE SURFACE COVERING WITH CONTROLLED PLATELET LAYER ORIENTATION

[75] Inventors: Timothy D. Colyer, Lancaster; Cheryl W. Landers, Millersville; Ralph W. Wright, Jr., Lancaster, all of Pa.

[73] Assignee: Armstrong World Industries, Inc., Lancaster, Pa.

[21] Appl. No.: 344,708

[22] Filed: Apr. 28, 1989

[51] Int. Cl.5 .............................. B32B 5/16
[52] U.S. Cl. .................... 428/141; 428/161; 428/162; 428/163; 428/164; 428/167; 428/172; 428/204; 428/908.8; 156/79; 156/277; 156/219; 264/45.1; 264/108; 264/112; 264/131; 264/293; 264/DIG. 82
[58] Field of Search ............... 428/204, 164, 141, 161, 428/162, 163, 167, 172, 908.8, 195; 156/79, 274, 279, 277, 219; 264/45.1, 108, 112, 131, 293, DIG. 82

[56] References Cited

U.S. PATENT DOCUMENTS

| | | | |
|---|---|---|---|
| 3,041,670 | 7/1962 | Broderson | 18/26 |
| 3,073,732 | 1/1963 | Hunsdiecker | 154/43 |
| 3,235,399 | 2/1966 | Martin, Jr. | 117/76 |
| 3,592,882 | 7/1971 | Morita | 264/1 |
| 4,126,727 | 11/1978 | Kaminski | 428/172 |
| 4,605,584 | 8/1986 | Herr, Jr. et al. | 428/142 |
| 4,756,951 | 7/1988 | Wang et al. | 428/204 |

Primary Examiner—Henry F. Epstein
Assistant Examiner—Nasser Ahmad

[57] ABSTRACT

A multi-dimensional image is obtained in a substantially flat surface covering by aligning the platelets of a platey material in the optical surface of the surface covering parallel to the exposed surface of the surface covering and realigning predetermined platelets to a predetermined angle with respect to the original alignment. The platelets can be realigned by pressing a gelled transparent or translucent element into the platey material containing layer or by mechanically embossing the platey material containing layer.

26 Claims, 2 Drawing Sheets

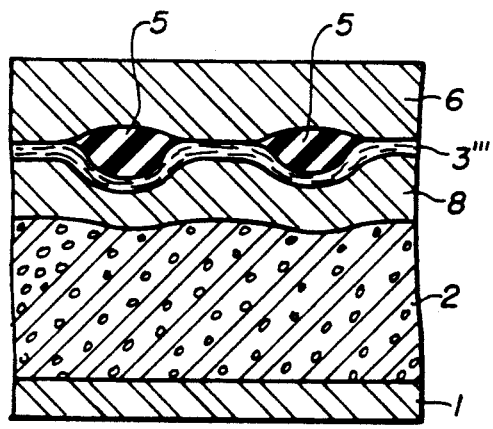
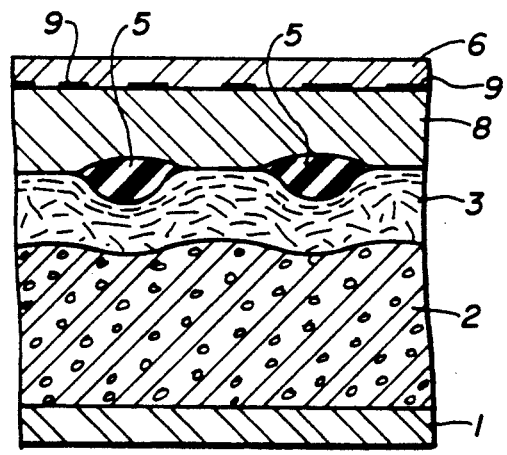
Fig. 7 Fig. 8
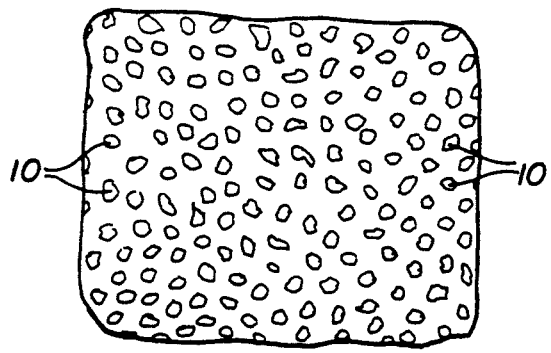
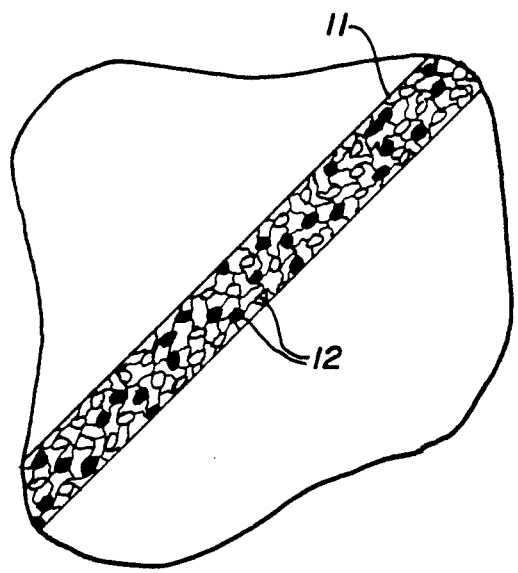
Fig. 9 Fig. 10

DECORATIVE SURFACE COVERING WITH CONTROLLED PLATELET LAYER ORIENTATION

BACKGROUND OF THE INVENTION

The present invention relates to a decorative surface covering product and a method of making such a surface covering product. In particular, the present invention relates to a surface covering product having a visible transparent or translucent layer containing a platey material. The platey material includes platelets which are substantially uniformly distributed within a first region of the transparent or translucent layer. The first region is divided into at least two predetermined regions identified as a second region and a third region. The platelets in the second region are substantially aligned within the second region and the platelets within the third region are substantially aligned within the third region. However, the platelets in the third region are aligned at a different predetermined angle with respect to the alignment of the platelets in the second region. Such a product has a unique and interesting visual effect.

In the preferred embodiments, the platey material is a pearlescent pigment such as the titanium dioxide coated mica platelets disclosed in U.S. Pat. Nos. 3,087,827; 3,087,828; 3,418,146 and 3,437,515. However, the term "platey material" is not limited to such pigments but also includes metallic and other reflective platelets.

Although the present disclosure is directed to floor coverings, the decorative surface coverings of the present invention include a wide range of surface coverings such as for a wall, ceiling, desk, table or countertop. The present invention can also be incorporated into surface layers on leather, fabrics, paper, wood, metals and glass, or used in upholstery, drapery, clothing materials, interiors for cars and bookcovers.

It is known in the prior art, when platey material is contained in a transparent or translucent visible surface layer, a lustrous pearlescent appearance is achieved. This is due to the flat or platey side of the platey material being oriented mainly parallel to the horizontal surface of the decorative surface covering and perpendicular to the angle of view.

Generally, manufacturers desire to maintain the flat side of the platey material substantially parallel to the horizontal surface of the decorative surface covering to produce a uniform or smooth, optimally pearlescent effect. However, Wang et al., U.S. Pat. No. 4,756,951, discloses a decorative surface covering including a transparent or translucent layer containing a platey material which is oriented in two or more different angles with respect to the surface of the layer to provide an enhanced three dimensional effect. Wang et al. achieved this effect by forming the layer with the platey materials aligned substantially parallel to the surface of the layer and then randomly distrubing the surface of the layer with air prior to gelling the platey material containing layer.

Although giving a unique effect, Wang et al. are unable to control the precise regions of the platey material containing layer to be effected. Further, they are unable to reorient the platelets to a desired predetermined orientation.

Kaminski, U.S. Pat. No. 4,126,727, discloses a resinous polymer sheet material including a translucent or transparent layer having decorative chips or flakes uniformly distributed therein. The chips or flakes contain titanium dioxide-coated mica or other platelets. The chips or flakes have a thickness of about 1 mil to about 50 mils, and a length and width from about 1/64" to about ⅜". The translucent or transparent layer having the chips or flakes uniformly distributed therein is laid over a pattern or design having relatively dark colored printed portions and relatively light colored printed portions. The chips or flakes located over the relatively dark colored printed portions are discernible from a distance of about five feet, whereas, the chips or flakes located over the relatively light colored printed portions are indiscernible from a distance of about five feet.

Kaminski teaches chemically embossing the surface covering. The light colored ink includes a blowing or foaming agent inhibitor so that the raised dark colored regions show the desired multi-colored nacreous effect and the relatively light colored lower portions or mortars do not show the multi-colored nacreous effect.

Broderson, U.S. Pat. No. 3,041,670, and Hunsdiecker, U.S. Pat. No. 3,073,732, teach methods of orienting platey material. However, both teach aligning the platey material in one direction only.

Herr, Jr. et al., U.S. Pat. No. 4,605,584, discloses a crinkled chip which includes platey material. At column 5, they state that a mottle including the crinkled chip "can be consolidated into a smooth surface, provided with a rotogravure print, and embossed.

Wiley et al., U.S. Pat. No. 4,675,212, describes a surface covering having a platey material containing ink printed on a transparent or translucent layer which overlays a rotogravure print.

SUMMARY OF THE INVENTION

In a preferred embodiment of the present invention, the platelets adjacent the visible surface of the platey material containing layer are aligned substantially parallel to the surface of the platey material containing layer as in the prior art. However, the surface of the platey material containing layer is modified to realign the platelets adjacent the modification. The platelets adjacent the modified surface remain substantially parallel to the modified surface but are aligned in a predetermined angle with respect to the platelets adjacent the unmodified visible surface of the platey material containing layer.

One preferred method of modifying the surface and realigning the platelets is to print a pattern of clear plastisol onto the platey material containing layer, gel the printed plastisol to form a discrete transparent or translucent element, and pressing the discrete element into the platey material containing layer. Another method is to mechanically emboss the platey material containing layer and backfill with a transparent or translucent plastisol which may form a wear layer.

BRIEF DESCRIPTION OF THE DRAWINGS

FIG. 7 is a schematic cross-sectional view of a fourth embodiment of the present invention in which the platey material containing layer is a transparent or translucent ink which is printed over a nonfoamable, conformable layer.

FIG. 8 is a schematic cross-sectional view of a fifth embodiment of the present invention similar to the FIG. 4 embodiment in which an opaque printed pattern is printed on a second transparent or translucent layer which overlays the platey material containing layer.

FIG. 9 is a representative printed chip pattern.

FIG. 10 is a representative printed chip surround pattern.

DETAILED DESCRIPTION OF THE INVENTION

The present invention provides a decorative surface covering having a unique and interesting visual effect. The materials and process steps used to form the present surface covering are well known in the art. However, those skilled in the art have not used the combination of materials and process steps in the order of the present invention and therefore, they have not been able to obtain the visual effect of the present invention.

The decorative surface covering is characterized by the aligning of a platelet pigment in the optical surface of the surface covering such that visible regions of the platelets forming the platey material are substantially aligned in at least a second and a third predetermined region with the alignment of the platelets in the third region being a predetermined angle with respect to the alignment of the platelets in the second region. By such means, a multi-dimensional image is obtained.

The optical surface is defined to be the region of the surface covering which is visible. This region extends from the exposed surface into the surface covering and includes the transparent or translucent wear layer, if any, and at least a portion of the platey material containing transparent or translucent layer.

Due to the controlled alignment of the platey material, the finished surface covering appears to have surface texture in selected regions or areas but is, in fact, smooth on the surface.

Figure 1:
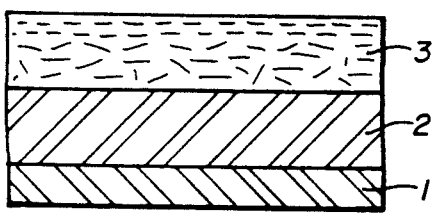
FIG. 1 is a schematic cross-sectional view of a floor covering of the present invention prior to realignment of the platey material adjacent the visible surface of the platey material containing layer.

FIG. 1 shows a cross-sectional view of one preferred embodiment during an early stage of manufacture. The backing or base coat 1 is of conventional construction. It may be felt, non-woven glass fiber, paper or a solid vinyl backing made on a release carrier. Typically, a foamable plastisol layer 2 is applied to the base coat. However, the layer 2 need not be foamable. Preferably, the plastisol layer 2 is somewhat compressible.

A platey material containing layer 3 is laid over the plastisol layer 2 by one of a variety of known coating techniques, blade-over-roll coating being the preferred method. The platey material containing layer is preferably a plastisol containing platelet pigment. The platelet pigment may be selected from a variety of pigments known in the art including metallic or other light reflective material. The preferred platelets are pearlescent or nacreous and have a major dimension of from about five microns to 60 microns. However, the present invention is not limited to the specified size range.

As known in the art, the platey material containing layer is gelled and planished to substantially align the platelets adjacent the visible surface of the platey material containing layer parallel to the surface. The platey material containing layer may be any gauge depending upon the desired application. For floor structures, six to ten mils is a typical thickness for the platey material containing layer. The preferred thickness for the platey material containing layer of the present invention is three to four mils.

Figure 2:
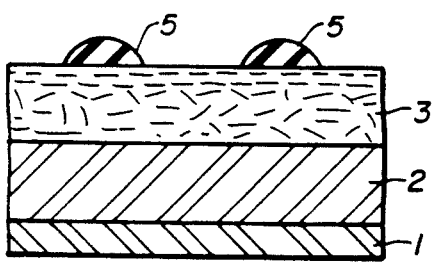
FIG. 2 is a schematic cross-sectional view of the FIG. 1 floor covering on which clear or transparent discrete plastisol elements have been printed.

After the platelets are aligned with the surface, selected areas are printed with the clear or transparent plastisol to form discrete elements 5 as shown in FIG. 2. The plastisol may be printed by any number of techniques known in the art. It is desired that the plastisol be at least one mil thick, two to four mils being a typical thickness. If a half-tone screen is used, the thickness of the plastisol can be ¼ to ½ mil or less.

Figure 3:
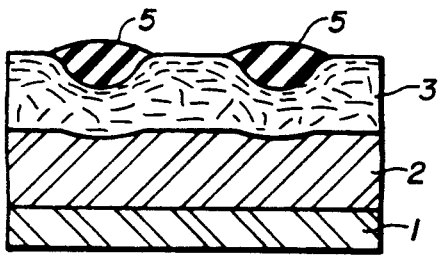
FIG. 3 is a schematic cross-sectional view of the FIG. 2 floor covering in which the gelled plastisol elements have been pressed into the platey material containing layer realigning the platelets adjacent the visible surface of the platey material containing layer.

The printed plastisol is gelled and pressed into the platey material containing layer by planishing or other means. Planishing the platey material containing layer causes surface smoothing and forces the printed and gelled plastisol element into the platey material containing layer, deforming the platey material containing layer adjacent its visible surface, and realigning the platelets near the visible surface as shown in FIG. 3. The deformation or disruptions of the platey material cause an internal texturing which can be registered with gravure-printed images to create realism in products such as marble imaging or to add a dimension of depth to any pattern.

Figure 4:
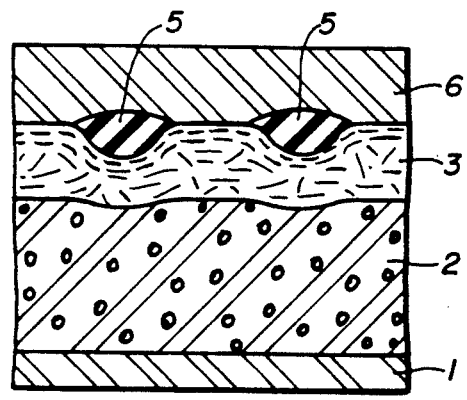
FIG. 4 is a schematic cross-sectional view of the FIG. 3 floor covering having a transparent wear layer adhered to the exposed surface of the platey material containing layer and having the blowing agent in the foamable layer activated.

As shown in FIG. 4, the structure is then coated with a clear vinyl wear layer 6 to produce a decorative surface covering with exceptional registered imaging. The wear layer may be gelled prior to activating the blowing agent in the foamable layer and fusing the layers. If the wear layer is gelled prior to foaming, the unmodified areas of platey material will appear more similar to the depressed areas of platey material than if the wear layer is ungelled. Gelling the wear layer tends to inhibit any realignment of the platey material adjacent the wear layer by the foaming action.

Due to the realignment of the platelets in the optical surface below the discrete plastisol elements 5, the surface of the decorative covering appears to be depressed. However, in reality, the surface of the discrete plastisol elements 5 opposite the platelets may actually protrude slightly above the major surface of the platey material containing layer 3. Further, the exposed surface of the wear layer 6 is substantially smooth.

Referring to FIG. 4, the upper portion of the platey material containing layer 3 in which the platelets are substantially aligned with the upper surface of the platey material containing layer is within the optical surface of the surface covering and forms a first region. If the portion of the first region which includes the platelets adjacent the major surface of the platey material containing layer is considered the second region and the portion adjacent the non-horizontal surface of the element 5 is considered the third region, the platelets in the third region are aligned at an angle with respect to the platelets in the second region.

Figure 5:
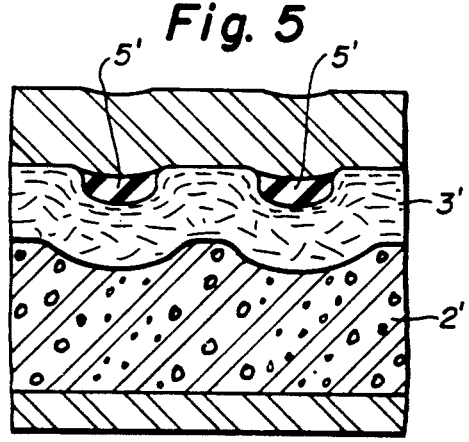
FIG. 5 is a schematic cross-sectional view of a second embodiment of the present invention in which the plastisol elements include a blowing agent inhibitor which has surpressed the foaming of the foamable layer adjacent the plastisol elements.

In the embodiment shown in FIG. 5, the discrete plastisol elements 5' include a blowing or foaming agent inhibitor such as benzotriazole. In this embodiment, activation of the blowing agent in the plastisol layer 2' is delayed a sufficient time to allow the inhibitor to migrate through the platey material containing layer 3' and into the foamable plastisol 2'. As a result of the foam inhibition, the visible surface of the discrete plastisol elements 5' is depressed below the major surface of the platey material containing layer 3'. The visual effect of the realigned platelets adds to the actual depression of the discrete plastisol elements to give an illusion of increased depth.

Figure 6:
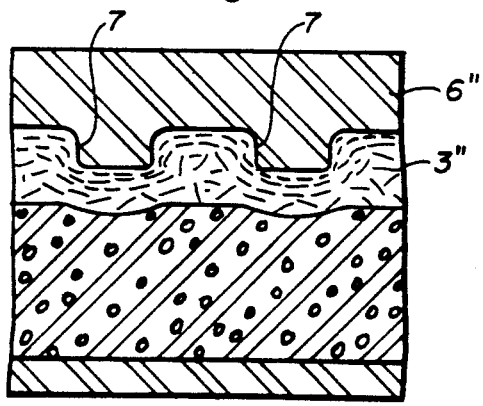
FIG. 6 is a schematic cross-sectional view of a third embodiment of the present invention in which the platey material containing layer has been mechanically embossed and a transparent wear layer backfilling the embossments.

In the third embodiment shown in FIG. 6, the platey material containing layer 3" is mechanically embossed yielding depressions 7 in the visible surface of the platey material containing layer and reorientation of the platey material adjacent the depressions. These depressions are backfilled with the plastisol of the wear layer 6".

As stated previously, in the preferred floor structure, the plastisol layer below the platey material containing layer need not be foamable but should be at least somewhat compressible. The compressibility of the layer facilitates pressing of the plastisol elements into the platey material containing layer.

Included within the present invention are embodiments in which regions of the platey material containing layer are devoid of platey material as well as embodiments in which the platey material is uniformly distributed throughout the platey material containing layer. An effect similar to that obtained by having regions devoid of platey material can be obtained by printing portions of the visible surface of the platey material containing layer with an opaque ink. Such an embodiment may be easier and less expensive to produce than one in which regions of the platey material containing layer are devoid of platey material.

In the embodiment shown in FIG. 7, a nonfoamable, comformable layer 8 is overlayed to the foamable layer 2. The nonfoamable layer 8 is preferably a polyvinyl-chloride but can be a polyvinylchloride copolymer, a polyester, a polyurethane, or other polymer.

A transparent or translucent ink 3''' containing the platey material is printed over the nonfoamable layer 8. The ink is preferably a rotogravure ink but may be a plastisol or other composition.

A key feature of the FIG. 7 embodiment is that the platey material containing ink be printed on a comformable layer. This enables the discrete plastisol elements 5 to deform the layer 8 and realign predetermined platelets of the platey material. As in the previous embodiments, a wear layer 6 may be overlayed the discrete plastisol elements 5 and platey material containing ink 3'''.

As seen in FIG. 8, the FIG. 4 embodiment may be modified by replacing the wear layer 6 of FIG. 4 with a transparent or translucent layer 8. An opaque ink 9 is printed on the layer 8 and a wear layer 6 is adhered to the printed surface.

An interesting and active visual can be obtained by forming a chip pattern in the platey material containing layer by printing numerous small discrete elements 5 which are pressed into the platey material containing layer 3 and printing the opaque ink 9 in a chip pattern such as 10 shown in FIG. 9. The result is an optical surface having two distinct levels of chips which causes the eye to focus on one level and then the other level.

The activity can be increased by using a noncontrasting, opaque ink 9. For example, if an opaque white pattern is printed over a white platey material containing layer, depending on the angle of the light, the printed areas appear whiter than the platey material or the platey material appears whiter than the printed area.

The opaque ink should cover 30% to 70% of the surface to give a proper balance between the two levels. Preferably, the opaque ink should cover 40% to 45% of the surface.

A similar effect can be obtained by printing the opaque ink 9 over an area such as 11 in FIG. 10 and then printing a chip pattern such as the chip surround pattern 12 in FIG. 10. If the pattern 12 is printed with a translucent noncontrasting ink, it can be printed over the entire surface of the surface covering and will form an opaque chip pattern in the areas of the opaque ink 11 but be nearly indiscernable over the platey material formed chips. This gives the illusion of the opaque ink being translucent.

Although the embodiments disclosed herein involve realigning the platey material by deforming the visible surface of the platey material containing layer, the breadth of the invention includes structures in which regions of the platey material are substantially aligned in two different predetermined angles without deforming the visible surface of the platey material containing layer and embodiments in which the platey material is not realigned but is initially aligned in at least two different alignments. Therefore, while the platey material in the optical surface of the disclosed embodiments is substantially parallel to the adjacent surface of the platey material containing layer over the entire surface, this is not an absolute limitation.

By being able to control the alignment of the platey material and the regions of the optical surface containing the substantially aligned platey material, surface coverings can be formed in which a predetermined region is replicated to form a repeating pattern. The prior art has been unable to produce a replicated pattern. The surface coverings of the prior art in which the platey material has been reoriented achieve such reorientation in an uncontrolled or random fashion.

EXAMPLE 1

This example illustrates a flooring structure containing the above-described imaging.

A foamable plastisol composition having the following formulation is coated onto a flooring felt backing at a thickness of 10 mils and gelled at 320° F. for 1.2 minutes in an air impingement oven:

| Foamable Plastisol Formula | phr |
|---|---|
| Vinyl chloride dispersion resin (Occidental 605[1]) | 72 |
| Vinyl chloride blending resin (Occidental M-70[1]) | 28 |
| Primary plasticizer (DOP[2]) | 45 |
| Epoxy stabilizer (Drapex 4.4[3]) | 1.0 |
| Zinc Octoate | 1.0 |
| ABFA blowing agent (Azo-bis formamide) Kempore AF[4] | 2.5 |

Another plastisol layer containing the platelet pigment having the following formula is applied to the plastisol gel at a thickness of 5 mils, and gelled around a hot-oil heated drum with a surface temperature of 270° F.

| Plastisol Containing the Platelet Pigment | phr |
| --- | --- |
| Vinyl chloride dispersion resin (Goodrich Geon 173[5]) | 94 |
| Vinyl chloride blending resin (Borden 260SS[6]) | 6 |
| Plasticizer (Texanol Isobutyrate[7]) | 16 |
| Plasticizer (Monsanto S-160[8]) | 26 |
| Stabilizer (Mark 275[3]) | 2 |
| Platelet pigment (EM Industries Afflair 121[9]) | 7.5 |

A rotogravure image is then printed onto the platelet-pigmented plastisol layer.

Next, a transparent PVC plastisol is rotary screen/blade coated in a pattern registered with the rotogravure-printed design. This layer is lightly gelled with a radiant heater for 2 seconds. The material continues onto a hot oil-heated drum with a temperature of 320° F. and is planished smooth at the exit of the hot oil-heated drum.

| Transparent PVC Plastisol | phr |
| --- | --- |
| Vinyl chloride dispersion resin (Occidental 1742[1]) | 70 |
| Vinyl chloride blending resin (Borden 260SS[6]) | 30 |
| Plasticizer (DOP[2]) | 25 |
| Plasticizer (Texanol Isobutyrate[7]) | 17.5 |
| Stabilizer (Mark 275[3]) | 2 |

The planishing of the rotary screen/blade coated layer causes deformation of at least the platelet-containing plastisol layer. The platelet pigment is realigned to follow the contours of the registered rotary screen/blade coated plastisol layer.

The resultant gelled composite is coated once again with a PVC layer (Formula below) at a thickness of 10 mils. The resultant material is fused and expanded at 400° F. to provide a final product which has the perceived texture below the surface, but the surface can be actually smooth.

| PVC Wear Layer | phr |
| --- | --- |
| Vinyl chloride dispersion resin (Goodrich Geon 173[5]) | 94 |
| Vinyl chloride blending resin (Borden 260SS[6]) | 6 |
| Plasticizer (DOP[2]) | 23 |
| Plasticizer (Texanol Isobutyrate[7]) | 17 |
| Stabilizer (Mark 275[3]) | 3 |

[1]Sold by Occidental Chemical Corporation
[2]Dioctylphthalate
[3]Sold by Argus Chemical Corporation
[4]Sold by National Polychemicals, Inc.
[5]Sold by B. F. Goodrich Company
[6]Sold by Borden, Inc.
[7]Sold by Eastman Kodak Company
[8]Sold by Monsanto Chemical Company
[9]Sold by EM Industries, Inc.

What is claimed is:

1. A decorative surface covering comprising a base and an optical surface overlying said base wherein said optical surface comprises a transparent or translucent material and a platey material, said platey material comprising platelets distributed substantially uniformly within a first region of said transparent or translucent material forming a platey material containing region, the platelets in said first region having a non-random pattern, said first region comprising a predetermined second region and a predetermined third region, the platelets of said second region being substantially parallel, the platelets of said third region being substantially parallel, the platelets in said third region being substantially aligned at a predetermined angle with respect to the alignment of the platelets in said second region, the exposed surface of the decorative surface covering adjacent the optical surface being substantially smooth.

2. A decorative surface covering comprising a base and an optical surface overlying said base wherein said optical surface comprises a transparent or translucent material, and a platey material, said platey material comprising platelets distributed substantially uniformly within a first region of said transparent or translucent material forming a platey material containing region, said first region comprising a predetermined second region and a predetermined third region, the platelets of said second region being substantially parallel, the platelets of said third region being substantially parallel, the platelets in said third region being substantially aligned at a predetermined angle with respect to the alignment of the platelets in said second region, the platelets in the optical surface of the first region being substantially parallel to the surface of the platey material containing region in the optical surface adjacent the platelets.

3. The surface covering of claim 1, wherein the platey material containing region is a transparent or translucent plastisol.

4. A decorative surface covering comprising a base and an optical surface overlying said base wherein said optical surface comprises a transparent or translucent material, platey material and a discrete transparent or translucent element, said platey material comprising platelets distributed substantially uniformly within a first region of said transparent or translucent material forming a platey material containing region, said first region comprising a predetermined second region and a predetermined third region, the platelets of said second region being substantially parallel, the platelets of said third region being substantially parallel, the platelets in said third region being substantially aligned at a predetermined angle with respect to the alignment of the platelets in said second region, said discrete transparent or translucent element extending into the platey material containing region, whereby the platelets in said third region are realigned in a predetermined manner, the platelets in the optical surface of the first region being substantially parallel to the surface of the platey material containing region in the optical surface adjacent the platelets.

5. The surface covering of claim 4, further comprising the platey material containing region overlying the base and the base being deformed adjacent the discrete element.

6. The surface covering of claim 4, wherein the third region comprises a portion of the platey material containing region below the discrete element and the platelets of the third region are substantially parallel to a portion of the surface of the platey material containing region below the discrete element.

7. The surface covering of claim 4, wherein the discrete element is printed on the surface of the platey material containing region and is pressed into the platey material containing region.

8. The surface covering of claim 4, wherein the surface of the discrete element opposite the platey material containing region is depressed below the surface of the platey material containing region adjacent but not contiguous to the element.

9. The surface covering of claim 8, wherein the discrete element includes a blowing agent inhibitor.

10. The surface covering of claim 1, wherein the transparent or translucent material further comprises a fourth region devoid of the platey material.

11. A decorative surface covering comprising a base and an optical surface overlying said base wherein said optical surface comprises a transparent or translucent material and a platey material, said platey material comprising platelets distributed substantially uniformly within a first region of said transparent or translucent material forming a platey material containing region, said first region comprising a predetermined second region and a predetermined third region, the platelets of said second region being substantially parallel, the platelets of said third region being substantially parallel, the platelets in said third region being substantially aligned at a predetermined angle with respect to the alignment of the platelets in said second region, the first region being replicated to form a repeating pattern in the decorative covering.

12. The surface covering of claim 11, wherein an opaque ink is printed over a portion of the surface of the platey material containing region to obscure the platey material below the opaque ink.

13. The surface covering of claim 12, wherein the opaque ink is in a chip pattern and the surface covering includes a transparent or translucent layer between the platey material containing region and the opaque ink.

14. The surface covering of claim 12, wherein a chip pattern is obtained by printing an opaque ink on a portion of the transparent or translucent layer and printing a chip surround pattern on the opaque ink.

15. The surface covering of claim 12, wherein the opaque ink obscures from 30% to 70% of the surface of the platey material containing region.

16. The surface covering of claim 12, wherein the opaque ink and platey material are of noncontrasting colors.

17. A method for making a decorative surface covering having an optical surface comprises:
  (a) providing a base
  (b) providing a transparent or translucent material;
  (c) providing a platey material comprising platelets;
  (d) forming a platey material containing layer having an optical surface and overlying said base, the platey material containing layer comprising the transparent or translucent material and the platey material;
  (e) aligning the platelets in a first region of the optical surface to be substantially parallel to the surface of the first region; and
  (f) realigning predetermined platelets in the first region to a predetermined different alignment whereby the first region includes a predetermined second region and a predetermined third region, the platelets of the second region being substantially parallel, the platelets of the third region being substantially parallel, the platelets in the third region being substantially aligned at a predetermined angle with respect to the alignment of the platelets in the second region.

18. The method of claim 17, wherein the platelets are realigned by pressing a discrete transparent or translucent element into the platey material containing region.

19. The method of claim 18, wherein the discrete element is gelled on the surface of the platey material containing region prior to being pressed into the region.

20. The method of claim 18, further comprising providing a conformable base, overlaying the platey material containing region over the base and pressing the discrete element into the platey material containing region whereby the base adjacent the discrete element is deformed.

21. The method of claim 18, wherein the discrete element includes a blowing agent inhibitor, the platey material containing region is overlayed on a blowing agent containing layer, and the blowing agent is activated after the discrete element is pressed into the platey material containing region whereby a portion of the inhibitor migrates into the blowing agent containing layer adjacent the discrete element prior to activation of the blowing agent and the surface of the discrete element opposite the platey material containing region is depressed below the surface of the platey material containing layer adjacent but not contiguous to the element.

22. The method of claim 17, wherein the platey material containing region is gelled adjacent the surface of the platey material containing region in the optical surface prior to realigning the platelets.

23. The method of claim 17, wherein the platelets are realigned by mechanical embossing.

24. The surface covering of claim 11, wherein the platelets in the optical surface of the first region are substantially parallel to the surface of the platey material containing region in the optical surface adjacent the platelets.

25. The surface covering of claim 2, wherein the platey material containing region is a transparent or translucent plastisol.

26. The surface covering of claim 2, wherein the transparent or translucent material further comprises a fourth region devoid of platey material.

* * * * *